(12) United States Patent
Horn et al.

(10) Patent No.: US 9,587,823 B2
(45) Date of Patent: Mar. 7, 2017

(54) LAMINAR FLOW JETS

(71) Applicants: Wallace Horn, Mansfield, PA (US); William Horn, Mansfield, PA (US)

(72) Inventors: Wallace Horn, Mansfield, PA (US); William Horn, Mansfield, PA (US)

( * ) Notice: Subject to any disclaimer, the term of this patent is extended or adjusted under 35 U.S.C. 154(b) by 668 days.

(21) Appl. No.: 13/952,036

(22) Filed: Jul. 26, 2013

(65) Prior Publication Data

US 2013/0309618 A1    Nov. 21, 2013

Related U.S. Application Data

(63) Continuation-in-part of application No. 13/209,538, filed on Aug. 15, 2011, now abandoned, which is a continuation of application No. 12/410,934, filed on Mar. 25, 2009, now Pat. No. 8,087,928.

(51) Int. Cl.
*F23C 5/08* (2006.01)
*F23D 14/22* (2006.01)
*F23D 14/32* (2006.01)
*F23D 14/58* (2006.01)
*F23D 14/78* (2006.01)

(52) U.S. Cl.
CPC ............... *F23C 5/08* (2013.01); *F23D 14/22* (2013.01); *F23D 14/32* (2013.01); *F23D 14/58* (2013.01); *F23D 14/78* (2013.01); *F23D 2213/00* (2013.01); *F23D 2214/00* (2013.01); *Y02E 20/344* (2013.01)

(58) Field of Classification Search
CPC .......... F23D 14/22; F23D 14/32; F23D 14/08; F23D 14/20; F23D 2900/14003
See application file for complete search history.

(56) References Cited

U.S. PATENT DOCUMENTS

| | | | |
|---|---|---|---|
| 1,424,163 A | 8/1922 | John | |
| 1,444,263 A | 2/1923 | Mustee | |
| 1,721,381 A | 7/1929 | Ellis | |
| 1,791,360 A * | 2/1931 | Kerr | F23D 14/04 239/407 |
| 2,095,065 A | 10/1937 | Hays | |
| 2,143,993 A | 1/1939 | Mcconnell | |
| (Continued) | | | |

*Primary Examiner* — Jorge Pereiro
(74) *Attorney, Agent, or Firm* — Wayne D. Carroll; IP Works, PLLC

(57) ABSTRACT

A laminar flow jet for a surface mix gas burner that provides increased stability, adjustability, and control over flame chemistries and characteristics. The present invention utilizes a novel shape, typically created by a tube having a cross-sectional shape and inserting it into a faceplate cutout, or conduit, having another cross-sectional shape. This nesting of one shape inside another promotes laminar gas flow and produces desired effects. Tubes may also be placed under the faceplate provided they maintain fluid communication with the conduits.

Further, a burner is constructed with adjacent gas delivery tubes of different cross-sectional shapes which are mechanically held in place radially. The tubes touch in a longitudinal direction at points along their respective inner and outer dimensions, achieving axial alignment and preserving the necessary laminar gas flow. This configuration greatly speeds manufacturing time which allows production of economical burners even when a greater number of jets is desired.

19 Claims, 11 Drawing Sheets

(56) References Cited

U.S. PATENT DOCUMENTS

| | | | |
|---|---|---|---|
| 2,369,236 A | 2/1945 | Stanley | |
| 2,537,542 A | 1/1951 | Norman, Jr. | |
| 2,702,080 A | 2/1955 | Gee | |
| 2,871,080 A | 1/1959 | Shelly | |
| 2,911,035 A | 11/1959 | Nieman et al. | |
| 3,204,682 A | 9/1965 | John et al. | |
| 3,291,190 A | 12/1966 | Radley | |
| 3,407,561 A | 10/1968 | Peacock | |
| 3,687,375 A * | 8/1972 | Griffiths | F02M 61/02 239/557 |
| 3,690,564 A | 9/1972 | Futerko | |
| 3,718,426 A | 2/1973 | Harris | |
| 3,777,502 A | 12/1973 | Michie et al. | |
| 4,756,685 A | 7/1988 | Davies et al. | |
| 5,055,032 A | 10/1991 | Altemark et al. | |
| 5,112,219 A | 5/1992 | Hiemstra | |
| 5,163,830 A | 11/1992 | Pfefferkorn | |
| 5,322,507 A | 6/1994 | Costello et al. | |
| 5,339,635 A | 8/1994 | Iwai et al. | |
| 5,494,437 A | 2/1996 | Kubota et al. | |
| 5,505,254 A | 4/1996 | Chiba | |
| 5,516,344 A | 5/1996 | Corrigan | |
| 5,545,033 A * | 8/1996 | Dick | C03B 5/2353 431/181 |
| 5,554,022 A | 9/1996 | Nabors, Jr. et al. | |
| 5,799,594 A * | 9/1998 | Dernjatin | F23D 1/00 110/265 |
| 5,803,725 A | 9/1998 | Horn et al. | |
| 5,814,121 A | 9/1998 | Travis | |
| 5,904,475 A | 5/1999 | Ding | |
| 6,027,333 A * | 2/2000 | Fujii | F23C 3/002 126/91 A |
| 6,050,809 A | 4/2000 | Fayerman | |
| 6,065,961 A | 5/2000 | Shaffer et al. | |
| 6,074,197 A | 6/2000 | Philippe | |
| 6,132,204 A | 10/2000 | Snyder et al. | |
| 6,277,323 B1 | 8/2001 | Bissonnette | |
| 6,283,159 B1 | 9/2001 | Tada | |
| 6,293,784 B1 | 9/2001 | Griffioen | |
| 6,325,618 B1 | 12/2001 | Benz et al. | |
| 6,467,261 B1 | 10/2002 | Hisanaga et al. | |
| 6,733,282 B2 | 5/2004 | Long | |
| 6,755,024 B1 | 6/2004 | Mao et al. | |
| 6,824,453 B1 | 11/2004 | Andersson | |
| 6,951,454 B2 | 10/2005 | Sarv et al. | |
| 7,063,527 B2 | 6/2006 | Clifford et al. | |
| 7,094,049 B2 | 8/2006 | Mizuno et al. | |
| 7,549,788 B2 | 6/2009 | Fujiwara et al. | |
| 8,087,928 B2 | 1/2012 | Horn et al. | |
| 8,246,345 B2 * | 8/2012 | Schutz | F23D 14/64 431/181 |
| 2003/0144662 A1 | 7/2003 | Wosnitza et al. | |
| 2004/0187526 A1 | 9/2004 | Shirota et al. | |
| 2004/0213083 A1 | 10/2004 | Fujiwara et al. | |
| 2007/0281264 A1* | 12/2007 | Simpson | C03B 5/235 431/181 |
| 2010/0159409 A1* | 6/2010 | Richardson | C03B 5/235 431/181 |
| 2011/0229836 A1* | 9/2011 | Schutz | F23D 14/64 431/181 |

\* cited by examiner

LAMINAR FLOW JETS

RELATED APPLICATIONS

This patent application is a continuation-in-part of co-pending patent application Ser. No. 13/209,538, entitled "Laminar Flow Jets" and filed Aug. 15, 2011, by the same inventors, priority of which is hereby claimed. That patent application is a continuation of patent application Ser. No. 12/410,934, also entitled "Laminar Flow Jets" filed Mar. 25, 2009, by the same inventors, since issued as U.S. Pat. No. 8,087,928, on Jan. 3, 2012. The contents of these aforementioned cross-referenced applications are hereby wholly incorporated by reference herein to the present application.

FIELD OF THE INVENTION

This invention relates to a laminar flow jet and its use in laminar fluid flow delivery system, particularly a gas burners (or "torch") for use in the glass and quartz working industries and other industrial fields. More specifically, it relates to the shape and orientation of the jet, both singularly and in an array, on a gas burner and their capacity for improved control over the mix of multiple gases, typically oxygen gas and fuel, allowing for greater adjustability over flame chemistries and maintenance over desired flame characteristics.

BACKGROUND OF THE INVENTION

Gas burners, or "torches," are commonly used in the industrial arts for producing a very hot flame to hand work material such as glass and quartz. These devices are also used by jewelers, metal workers, and silversmiths. They can also have other uses including heating plastics. These burners are capped off by faceplates made of heat resistant material, typically stainless steel. Gases enter the body of the burner from a source sealed with a valve. Valves are used to meter the gas into the burner body by the user as needed. Gases travel from the burner body to the surface of the faceplate through a series of tubes, conduits, and isolated chambers. The greater the number of different gases, the more intricate the tubing, conduit, and chamber structure within the burner. Gases travel through these inner workings and to the surface of the faceplate through a series of strategically placed openings, or "jets." These jets enable the gases to travel to the faceplate surface with laminar flow. The shape of the jet greatly affects the effectiveness of laminar flow. Laminar flow is desired as it promotes a safer, more stable, and more controllable flame.

Jets also have great influence over the chemistries, temperatures, and other characteristics of the flames. If the jet is shaped even slightly differently, flame attributes can change drastically. Poor jet design and shape can lead to turbulent flow, inadequate mix of multiple gases, unstable flames, discoloration of glass, unwanted impurities (called "scumming") and a number of other consequences that make flames unsuitable for glass working. The jet shape, in conjunction with chemistry, can also affect the physical characteristics of the flame, including its width, smoothness, and intensity.

Gas burners containing laminar flow jets that minimize the aforementioned unwanted effects are highly desirable in the glass working industry. Preferred burners also employ an array of multiple laminar flow jets, each able to concurrently emit two, sometimes more, distinct gases.

Multiple gases can be used individually or simultaneously, and can be manipulated to achieve reduction, neutral, oxidized, and over-oxidized flame chemistries. In this context, flame chemistry refers to the resultant flame properties caused by the mixture of two or more gases, typically oxygen gas and carbon-based fuel. Therefore, it is an object of the invention to get the most complete combustion out of the gasses for maximum efficiency and to enhance flame chemistry and heat density throughout the entire flame range. The laminar flow jet of the present invention provides maximum control over the flame to manipulate multiple flame characteristics.

Burners obtain these chemistries not only through appropriate jet shape, but also through exact alignment and axial concentricity of the inner tubes, conduits, and chambers that supply the different gases. The orientation of the jet on the gas burner faceplate also affects flame characteristics. This requires a difficult manufacturing process but is essential in establishing a laminar gas flow that produces a high quality and efficient flame (i.e. greatly reducing unburned gases).

Production costs increase significantly as the number of jets in the faceplate array increases. This is due, in part, to the greater number of holes and openings that must be manufactured into the faceplate to create effective laminar flow jets. Therefore more efficient jet design allows for fewer jets in the faceplate to equal the same heat output as torches requiring many more jets in the faceplate.

Efficient jets allow the use of alternative oxygen sources that have lower pressure and flow capabilities. Alternative oxygen sources are becoming widely used in the form of onsite oxygen concentrators and generators due to the increasing cost of tanked oxygen.

Therefore, this invention also aims to reduce the number of openings in the faceplate, as needed, without affecting the jets' ability to produce laminar flow and maintain desired flame chemistries. Some embodiments of the present invention accomplish this goal with a two-gas jet, while others utilize a three-gas, multiple opening, multiple tube configuration.

There is therefore a need in the art for a shape and structure of a laminar flow jet and its use in a gas burner, both singularly and in an array, to provide users with enhanced adjustability over flame chemistries, without sacrificing control and stability of multiple gases so that high quality flame and desired chemistries are preserved.

SUMMARY OF THE INVENTION

In order to meet a need in the art for a shape and structure of a laminar flow jet and its use in a gas burner, both singularly and in an array, to provide users with enhanced adjustability over flame chemistries, without sacrificing control and stability of multiple gases so that high quality flame and desired chemistries are preserved, the present invention has been devised.

The present invention is a laminar flow jet with a novel shape, said shape allowing the jet to emanate multiple gases and blend them at the burner's faceplate surface to achieve desired flame chemistries and characteristics. These gases are individually received from multiple sources and subsequently fed into the burner body. Shapes may be basic and geometric, such as a circle or square, or abstract, like a filigree or snowflake. Specifically, the novel jet shape is a combination of a first, outer shape of greater dimension, having a second shape of smaller dimension inserted in it through various means. Typically, the first shape having greater dimension is manifested as a hole in the burner faceplate. The second shape of smaller dimension is typically formed by the cross-sectional shape of a tube nested inside the faceplate hole.

Preferably, the novel jet shape is an outer teardrop shape of greater dimension surrounding a substantially circular shape of lesser dimension, said circular shape created by a tube with a circular cross-section. The circular tube divides the teardrop shaped opening into two separate holes. These holes, as well as the hollow tube that divides them, all promote the unobstructed flow of gases. When precisely the right ratio of gases emanating from these holes is achieved—typically oxygen gas in the outer holes and fuel in the inner tube—then this configuration provides for greatly enhanced flame characteristics.

The most efficient means of creating these proper shape ratios is by nesting one shape inside another. Nesting the smaller shape inside the larger divides the larger shape into multiple openings, as best envisioned by the circular tube-in-teardrop opening configuration. Generally, the larger, outer shape is created by cutting out a portion of the faceplate, often by drilling. The smaller, inner shape is created by a tube. The surface of the tube is preferably flush with the surface of the faceplate. Securement between tube and inner wall of the faceplate opening occurs at longitudinal points along the length of the outer wall and inner wall of the opening directly contacting each other, thus dividing the faceplate opening into two sections. This configuration also ensures axial alignment of the tube and cutout along their lengths, as longitudinal points along the outer surface of the tube directly contact longitudinal points along the inside wall of the faceplate.

Although the present invention does not limit the number of shapes that can be nested inside each other, most embodiments of the present invention have one shape nested inside the other, i.e. one tube nested inside the faceplate cutout. These embodiments are the most economical, as they require only two gases and minimal tubing. In the event that another gas is needed, another tube is nested inside the first tube to create additional openings. Like the first tube and cutout, the additional tube has a cross-sectional shape, and has longitudinal points along its outer wall in direct contact with longitudinal points along the inner wall of the first tube. This configuration ensures stability of gases and proper axial alignment of tubing. Further, the top surfaces of additional tubes are flush with the faceplate and first, outer tube. Conceivably, the present invention does not limit the number of tubes that can be nested inside of each other, as added tubes would further enhance the control over the flame and provide better axial alignment.

In this context, an array refers to any combination or pattern of a plurality of laminar flow jets. However, for optimal results, the arrangement should be configured to promote desired flame characteristics. Therefore, multiple laminar flow jets should be arranged in a way that promotes desired flame shape and chemistries. For example, an array of laminar flow jets with a circular tube-in-teardrop cutout nesting shape can be arranged in a ring around the circumference of the faceplate. Another array may also exist in the center of the faceplate. Different groups and/or arrays of jets do not need to resemble each other. A faceplate may contain an array of jets configured in a ring on its outer rim and also contain an inner array resembling a grid, flower pattern, or another ring of jets.

A laminar flow jet delivers the different gases to the faceplate surface where they are ignited and used for glass working. Prior to arriving at the faceplate, each gas comes from a separate and distinct source, usually a storage tank. After arriving from these sources, gases typically pass through a valve before entering the body of the burner. In this context, valves are devices that allow users to meter specific quantities of gas into the burner. The volume of gas may be changed as needed, as the ratio of gases also affects flame chemistries. After passing the valve, each gas enters the body of the burner and contained in a separate, isolated chamber. Chambers are fluidtight, preventing seepage of one chamber's contents into another. The burner has one chamber for each gas used. Preferably, the present invention utilizes two gases, typically oxygen gas and fuel; in this respect, the burner body should have two separate chambers.

Chambers are stacked in parallel relative to the faceplate such that when the burner is held vertically, the chambers resemble floors in a building with the faceplate acting as the roof. In this particular configuration, a first, bottom chamber is at the base of the burner body, a second, top chamber sits on top of the first, and the faceplate caps off the second chamber. Additional chambers housing additional gases are stacked in the same fashion. A capped faceplate provides a fluidtight seal between it and the burner body. When working with fuel and oxygen gas in the two-chamber embodiment, the fuel is housed at the first, bottom chamber furthest from the faceplate and the chamber containing the oxygen separates the fuel chamber and faceplate.

Since the chambers are fluidtight, the only way gas can travel from the first, bottom chamber to the faceplate surface is through a tube. A first end of the tube is in fluid communication with the first, bottom chamber and its second end is exposed and flush with the faceplate. The cross-sectional shape of this tube forms the inner, nested shape of the laminar flow jet and divides the faceplate cutout that defines the outer shape, thus forming separate openings. The portion of tube between the two ends extends through the second, top chamber containing the other gas. Additional tubes leading to extra chambers are axially nested inside outer tubes as previously described and extend through additional chambers in the same fashion as the two-chamber configuration.

Usually, each laminar flow jet utilizes its own individual tube (and an additional tube for every additional gas). However, alternate embodiments allow for a single tube leaving the first chamber and branching out to several tubes that are in communication with the surface of the faceplate. Other embodiments can contain a combination of these tube configurations; for instance, one jet can use one tube alone while an array on the same faceplate can use a single tube that ultimately branches out. These branches will typically have the same cross-sectional shape, ensuring uniform laminar flow jet shape and structure, but this is not required. This invention is not limited in the number of cross-sectional shapes found across multiple jets on the same faceplate. Tubes are typically made of the same heat resistant material as the faceplate but can be made of a different, yet still heat resistant, material.

Gas travels from the top chamber to the faceplate surface through a conduit. In this context, a conduit is the cavity outlined by the outer shape cutout in the faceplate and bounded by the outside wall of the tube and the length of the faceplate. Each laminar flow jet contains at least one conduit. Many conduits can be fed from a single source, chamber, feed, valve or other passageway that delivers gas. In the preferred oxygen gas and fuel embodiment, the oxygen gas, housed in the top chamber, flows through the conduits to reach the faceplate surface. When a tube is in proper position, it divides the conduit into separate segments. Gas travels from the top chamber and through the conduit all around the outside of the tube except at the longitudinal points where the outside wall of the tube is in direct contact with the inside wall of the faceplate, throughout the length of the faceplate.

For instance, when the outer shape of the laminar flow jet is a teardrop, and the inner shape (i.e. the cross-sectional shape of the tube) is a circle, the circular tube divides the teardrop into two separated segments. The segment at the rounded end of the teardrop resembles a crescent moon shape, and the segment at the pointed end resembles a triangle with an arcuate base. The spaces defined by the crescent moon shape and pointed shape of the overall teardrop are both in communication with the top chamber but are not in communication with each other throughout the length of the faceplate as they are separated by the tube. This aspect of the invention highlights the importance of having longitudinal points along the outer surface of the tube directly contact longitudinal points along the inside wall of the faceplate. In the instance that this direct contact does not occur, axial alignment of the tube and cutout may be thrown off. Further, an excess of either gas can mix into the flame, creating unwanted chemistries.

Having increased control over flame chemistries is a primary object of this invention. Further, the laminar flow jet of the present invention is not restricted to specific types of flame chemistries. Instead, the current invention provides enhanced stability and control over many flame chemistries, including, but not limited to: reduction flame, neutral flame, oxidized flame, and over-oxidized flame. Reduction flame chemistry refers to the excess unburnt fuel in the flame that contains carbon. Depending on the need, reduction flame can be used for certain types of glass to strike color or create a hazing effect. Alternatively, undesired reduction flames can "scum" glass, meaning it instills unwanted impurities in the glass, and can ultimately destroy the workpiece. Neutral flame chemistry refers to the balance of fuel and oxygen gas in the flame. Oxidized flame chemistry refers to the excess unburnt oxygen in the flame, and, like reduction flame, is used for certain types of glass to strike color or create visual effects. Over-oxidized flame chemistry refers to the extreme excess of unburnt oxygen in the flame. An undesired over-oxidized flame usually scums glass similar to reduction flame.

As previously described, the laminar flow jet shape and chemistry affect physical characteristics of the flame. Reduction and neutral flame chemistries lead to wide, bushy flames with a smooth shape. Neutral, oxidized, and over-oxidized flame chemistries create hard, narrow, and driving flames with pinpoint shapes. Since the present invention allows for increased adjustability over flame chemistries, users can obtain a wider variety of flame characteristics as compared to laminar flow jets and burners already known in the art.

An alternate embodiment of the invention accounts for a configuration in which tubes are not flush with the top of the faceplate. Instead, the top surface of the tube directly contacts the bottom surface of the faceplate. This embodiment uses specifically manufactured holes and plurality of conduits to form an efficient laminar flow jet as opposed to the tube-in-cutout configuration previously described. The faceplate, in this case, includes at least two individually manufactured openings, both of which act as conduits. At least one of the conduits is in communication with a tube, which terminates at the base of the faceplate. The other end of the tube is in fluid communication with an isolated, bottom chamber inside the burner. The other conduit is in communication with the chamber closest to the faceplate, as is consistent to the previously disclosed embodiments.

Additionally, in previously disclosed embodiments, the tube is flush with the surface of the faceplate and the conduits are defined as the volume inside the faceplate in direct communication with the top chamber as bounded by the outer walls of the tube. Here, when the faceplate is secured to the burner body, it isolates the tube such that the gas only flows from the tube into this conduit. The gas then travels from the conduit to the surface of the faceplate, but never into other chambers of the burner body.

Further, since the tube terminates at the base of the faceplate and does not pass through the conduit, the faceplate may contain an undrilled portion that divides the conduit. These undrilled portions, specifically designed to promote proper laminar air flow and desired flame characteristics, pass directly over the tube to create different conduit shapes. This configuration provides the division in the openings that function similarly to the nested shape design of the preferred embodiments.

The present invention accounts for a plurality of these laminar flow jets specifically arranged on a burner head to acquire and adjust a variety of glass-working flames. Jets are specifically arranged to maximize the stability of flame and maintain laminar flow, as well as obtain the desired flame chemistries and characteristics. According to the invention, a burner head is constructed with adjacent gas delivery tubes of different geometric cross-sectional shapes which are mechanically held in place radially. The tubes housing separate gases touch in a longitudinal direction at points along their respective inner and outer walls so that precise axial alignment whether coaxial or axially offset, is achieved while preserving the necessary laminar gas flow. This configuration greatly speeds the manufacturing time, allowing production of economical burners even when a greater number of faceplate jets is desired. For burners that utilize three or more gases (and therefore having at least two tubes), the tube-to-tube contact is also beneficial to the operation of the burner by providing a heat transfer path way from the innermost tube, which prevents overheating.

Examples of the simplest geometric tube shapes employed are, for example, a square within a circle, or conversely, a circle within a square. In the former case, the outside diagonal dimension of the square is almost equal to the inside diameter of the surrounding circular tube so that the abutment of the tubes along the outside of the corners of the square ensures precise coaxial alignment without requiring the precision assembly necessary to hold two coaxial, non-touching circular tubes such that each tube is held precisely centered by its end, a position necessary to maintain the evenness of the laminar gas flow as seen in the prior art. In accordance with the invention, the latter example of a square tube surrounding a circular tube provides a direct mechanical means through radial interference to maintain the desired coaxial alignment of the tubes. In this case, the outside of the circular tube is dimensioned to be equal to the inside dimension of the surrounding square tube between opposite sides. The two tubes therefore are in contact at lines along four points around the circumference of the circular inner tube, where they meet the inside walls of the outer square tube. In either case, the alignment is maintained by direct mechanical contact between the tubes along their sides rather than holding them in non-contacting relation by a supporting structure at end points of the tubes as in the prior art. It will be readily understood therefore that the present system provides a much more economical means of producing a pair of axially positioned gas jets. It has also been found that the flame characteristics are improved and carbon-buildup is reduced.

More specifically, the present invention allows the laminar axial flow of different combined fluids comprising a first fluid conduit tube having a first cross-sectional shape and a second fluid conduit tube having a second cross-sectional shape wherein longitudinal points along an inside wall of one of said tubes are in contact with longitudinal points along a outside wall of the other tube for radially maintaining axial alignment along their length. The space between said tubes is a conduit for one of said fluids. At a faceplate, the tubes open to the surrounding atmosphere at a common longitudinal terminus where the fluids are combined.

In one embodiment of the invention, a gas burner for producing a flame comprises a head portion including a faceplate being the terminus of a plurality of elongate axially aligned gas delivery tubes. At least two of said tubes deliver two different types of fuel to said faceplate. A first tube has a first polygonal cross-sectional shape and a second tube has an arcuate cross-sectional shape. Longitudinal points along an inside wall of the first tube are in contact along a longitudinal line on an outside wall of the second tube for maintaining the axial alignment of the tubes.

In order to provide yet greater economies of producing the present invention, an alternate embodiment of the invention employs faceplate inserts to provide the desired non-circular geometric shape so that each non-circular shape does not have to be individually cut out of the faceplate material.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention. These and other constructions will become obvious to those skilled in the art from the following drawings and detailed description of the preferred embodiment.

DETAILED DESCRIPTION OF THE PREFERRED EMBODIMENTS

The following detailed description and corresponding drawings are of the best currently contemplated modes of carrying out exemplary embodiments of the invention. The description is not to be taken in a limiting sense, but is made for the purpose of illustrating the general principles of the invention.

Figure 1:
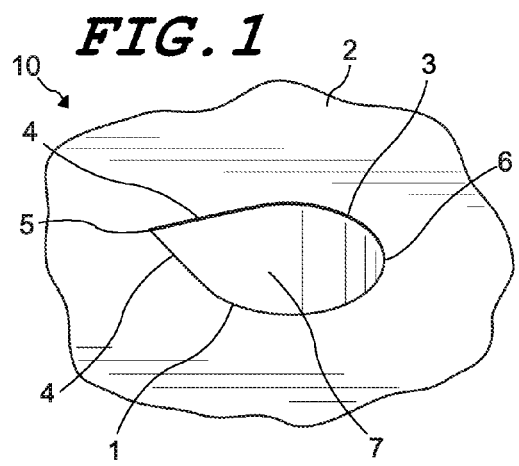
FIG. 1 is a top front isometric view of a teardrop shaped cutout for use in a laminar flow jet of the present invention.
Figure 2:
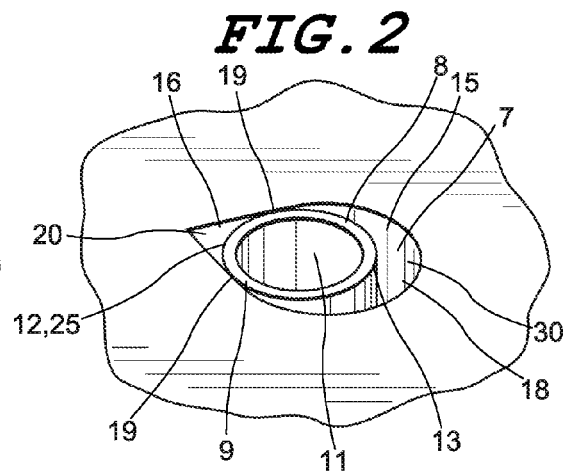
FIG. 2 is a top front isometric view of a teardrop shaped cutout with a nested circular tube for use in a laminar flow jet of the present invention.

FIG. 1 depicts a teardrop shaped cutout 1 for use in a laminar flow jet 10. The cutout 1 is made in a faceplate 2, shown here as a section. The faceplate 2 is generally made of any heat resistant material but typically stainless steel. The cutout 1 has a rounded end 3 of specific diameter and forming a partial circle. Before the circle is complete, the sides 4 taper off and come together at a point 5, wherein the point 5 is preferably opposite the furthermost point 6 of rounded end 3. The teardrop shaped cutout 1 extends all the way through faceplate 2 to create conduit 7. Conduit 7 is adapted to accept a tube 8 as seen in FIG. 2. Preferably, conduit 7 is in fluid communication with a top chamber 140 of the burner 100, allowing the flow of oxygen gas to reach the surface of faceplate 2 as best viewed in FIG. 17.

FIG. 2 depicts the preferred embodiment of a singular laminar flow jet in which teardrop shaped cutout 1 accepts circular tube 8, said tube 8 extending through conduit 7. Circular tube 8 has a specific thickness 9 that is predetermined such that desired flame chemistries and maximum flame control are achieved. The tube 8 is in fluid communication with a bottom chamber 130 of the burner 100, allowing the flow of fuel to travel through the inner cavity 11 of tube 8 and reach the surface of faceplate 2 as best viewed in FIG. 17. The outer wall 12 and 13 of tube 8 directly contacts the inner wall 15 and 16 of conduit 7 at longitudinal points 19 throughout the length of tube 8 and conduit 7.

This direct contact effectively divides conduit 7 into two separated, isolated conduit section 20 and 30. Section 20 (i.e. the portion representing the point of the teardrop) is bounded by a portion of outer wall 12 of tube 8 and a portion of inner wall 16 of conduit section 20. section 20 has a cross-sectional shape of a triangle with inverted arcuate segment 25 at the base, said triangle topped by the teardrop point 5. Section 30 is bounded by a portion of outer wall 13 of tube 8 and portion of inner wall 18 of conduit section 30. Section 30 has a cross-sectional shape of a crescent moon, wherein the points of said crescent moon terminate at the longitudinal points 19. Oxygen gas is free to flow all throughout conduit sections 20 and 30 except at longitudinal points 19 where the tube 8 seals and isolates the two segments. The division of conduit 7 into sections 20 and 30 does not affect the flowing of carbon-based fuel throughout inner tube cavity 11.

Figure 3:
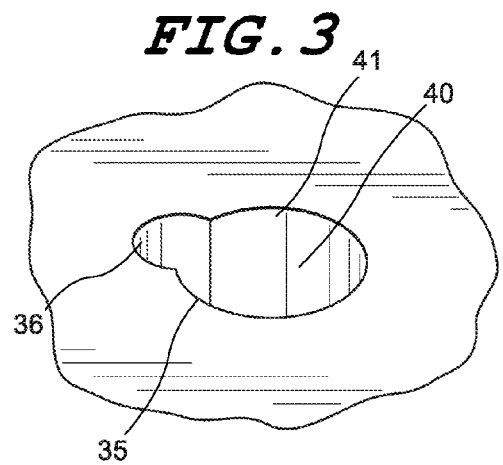
FIG. 3 is a top front isometric view of a generally lightbulb shaped cutout for use in a laminar flow jet of the present invention.

FIG. 3 illustrates an alternate embodiment of the invention: a generally lightbulb shaped cutout 35. Unlike the tapered sides 4 and teardrop point 5 of the preferred embodiment seen in FIG. 1, the cutout 35 features a rounded segment 36. This rounded segment 36 represents the "base" of the lightbulb.

Figure 4:
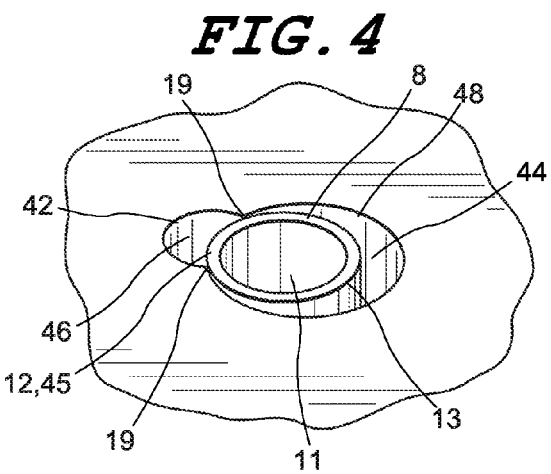
FIG. 4 is a top front isometric view of a generally lightbulb shaped cutout with a nested circular tube for use in a laminar flow jet of the present invention.

Similarly, FIG. 4 depicts the alternate embodiment of a singular laminar flow jet in which lightbulb shaped cutout 35 accepts circular tube 8, said tube 8 extending through conduit 40. Tube 8 divides conduit 40 in two isolated sections 46 and 48 in the same fashion as depicted in FIG. 2 such that oxygen gas may flow freely throughout the conduit sections 46 and 48 except where longitudinal points 19 along the length of tube 8 directly contact the inner wall 41 of conduit 40.

Isolated section 46, (i.e. the portion representing the base of the lightbulb) is bounded by a portion of the outer wall 12 of tube 8 and inner wall 42, and has different cross-sectional shape than the pointed triangle with arcuate base 25. Instead, the cross-sectional shape of conduit section 46 has a crescent moon shape, bounded by rounded segment 36 as its outer diameter and interior diameter 45. Interior diameter 45 has much shorter length than that of outer wall 13 of tube 8 which defines the interior diameter for the crescent moon cross-section of conduit section 48 (and, similarly, section 30 shown in FIG. 2). Section 48 is bounded by the outer wall 13 of tube 8 and inner wall 44.

Figure 5:
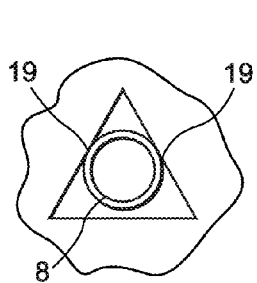
FIGS. 5-8 are top plan views of alternate embodiments of the nested tube-in-cutout configuration for use in a laminar flow jet shown in FIGS. 2 and 4.
Figure 6:
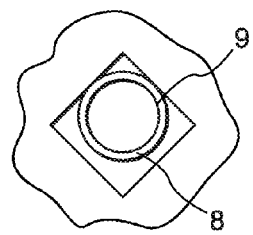
Figure 7:
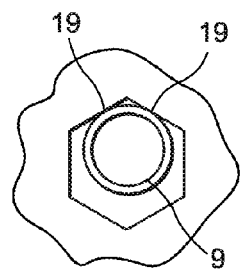

FIGS. 5 through 7 all depict alternate embodiments for the laminar flow jet of the present invention. The faceplate 2 openings are depicted as a triangle, square, and hexagon, in FIGS. 5, 6, and 7, respectively. These three embodiments depict circular tubes 8 of a specific thickness 9. In all examples, the circular tube directly contacts an interior wall of the alternatively shaped conduit at longitudinal points 19 throughout their lengths, thus sealing off two separate and isolated conduit sections. These drawings are intended to illustrate the variety of opening shape that can be used in the present laminar flow jet 10 invention.

Figure 8:
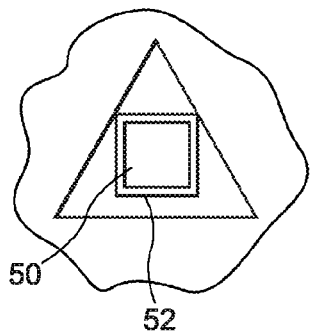
Figure 10:
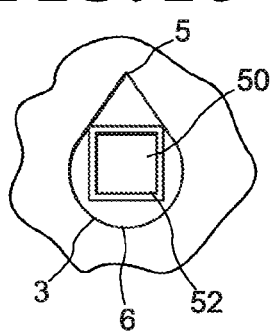
FIG. 10 is a top plan view of a teardrop shaped cutout with a nested square tube for use in a laminar flow jet of the present invention.

Similarly, FIGS. 8 and 10 depict alternate embodiments of the present invention, through illustration of a triangle and teardrop opening, respectively. However, they differ from previous Figures in that they feature a square tube 50 having thickness 52 as opposed to the conventional circular tube 8 with thickness 9. The square tube 50 directly contacts an inner wall of each shape's faceplate, effectively dividing the existing conduit into two separate and isolated conduit sections. In this context, a square refers to any generally four-sided geometric shape, and therefore includes all rectangles.

Figure 9:
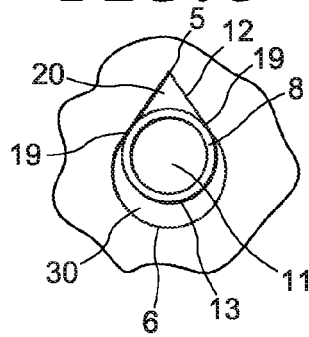
FIG. 9 is a top plan view of a teardrop shaped cutout with a nested circular tube for use in a laminar flow jet of the present invention.

FIG. 9 illustrates a top view of the preferred embodiment: a teardrop shaped opening 1 with nested circular tube 8. Here, the basic features of the preferred laminar flow jet 10 are shown, including conduit segments 20 and 30, circular tube 8 outer walls 12 and 13, as well as the teardrop's outermost points 5 and 6.

Figure 11:
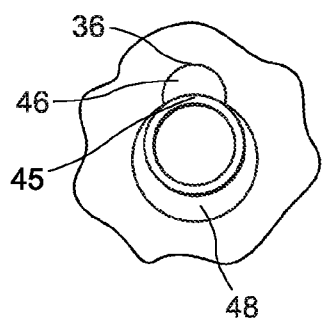
FIG. 11 is a top plan view of a generally lightbulb shaped cutout with a nested circular tube for use in a laminar flow jet of the present invention.

Similarly, FIG. 11 provides a top view of the alternate lightbulb shape cutout 35. Basic features of this embodiment, including rounded segment 36 and isolated conduit sections 46 and 48 are shown.

Figure 12:
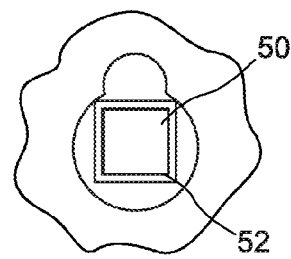
FIG. 12 is a top plan view of a generally lightbulb shaped cutout with a nested square tube for use in a laminar flow jet of the present invention.

FIG. 12 depicts an alternate embodiment of the lightbulb shaped cutout 35 having square tube 50 with thickness 52. Like the embodiments disclosed in FIGS. 8 and 10, the square tube 50 divides one conduit of larger dimension into two conduits of smaller dimension such that gas may flow throughout these isolated conduits except at the point where the tube makes direct contact with the inner wall of the faceplate.

Figure 13:
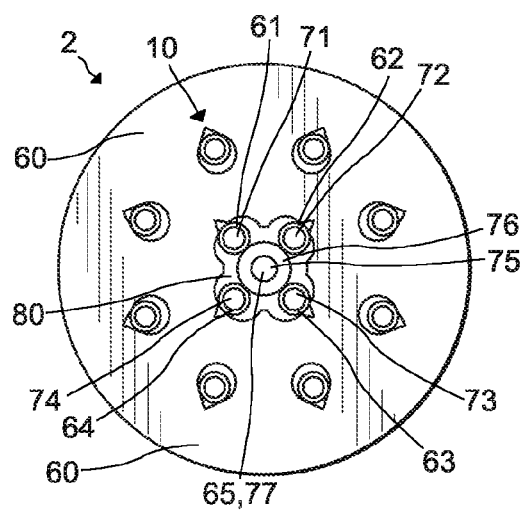
FIGS. 13-14 are top plan views of a gas burner faceplate featuring an array of teardrop shaped cutout with a nested circular tube laminar flow jets arranged in an outer ring.
Figure 14:
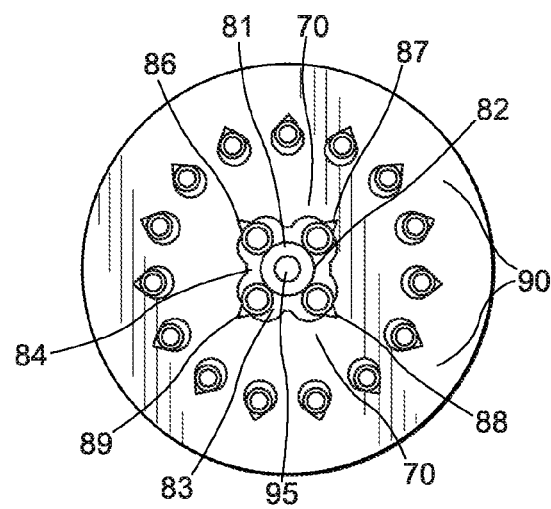

Featured in FIGS. 13 and 14 are the preferred embodiment of the full burner head faceplate 2, complete with a plurality of laminar flow jets 10. The laminar flow jets 10 include the preferred teardrop shaped opening 1 and nested circular tube 8 configuration. Shown in FIG. 13 is an array of eight jets 10 are radially arranged relative to a centerpoint 65 of faceplate 2 in an outer ring 60. The points 5 of the teardrop shape 1 point away from substantially the centerpoint 65. Preferably, the laminar flow jets of this embodiment are arranged such that jets featured on opposite sides of the centerpoint 65 are mirror images of each other.

Figure 15:
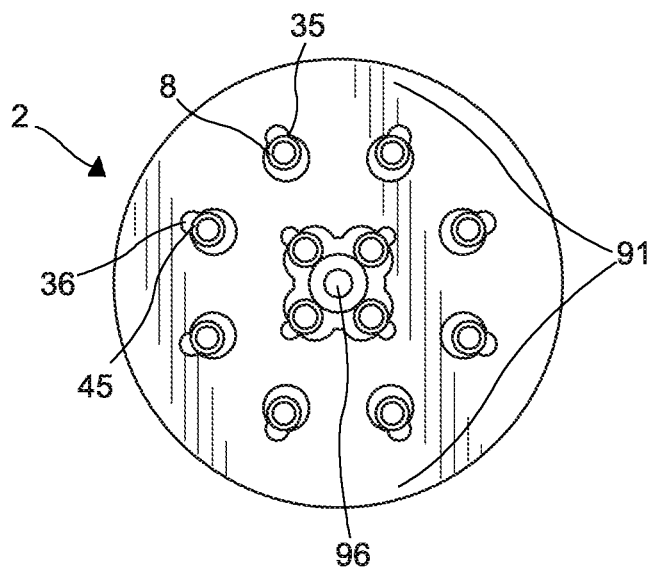
FIGS. 15-16 are top plan views of a gas burner faceplate featuring an array of a generally lightbulb shaped cutout with a nested circular tube laminar flow jets arranged in an outer ring.
Figure 16:
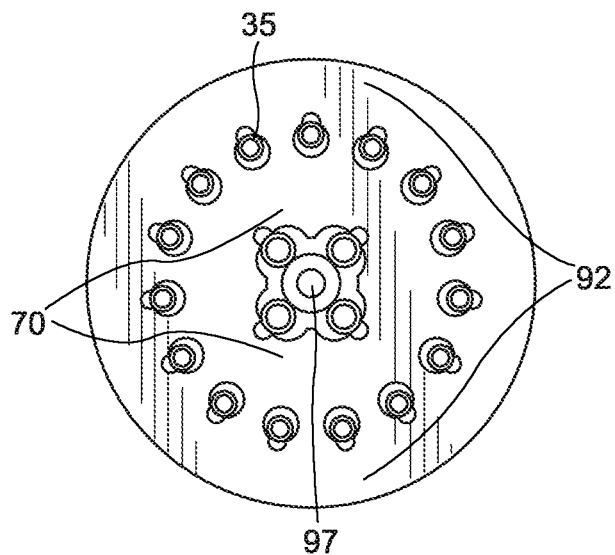

Surrounding the centerpoint 65 is another array of laminar flow jets 10 arranged in a flower pattern 70 (also shown in FIGS. 14-16). This flower pattern 70 includes a series of five tubes, four of which (reference numbers 61, 62, 63, and 64) are in direct abutment at each "corner" with a center tube 75 having greater thickness 76 than the other four. The four tubes 61, 62, 63, and 64 in the corners have the same thickness 9 and cross-sectional shape as found in the tubes 8 of the laminar flow jets 10 in the outer ring 60. All five tubes 61, 62, 63, 64, and 75 are in fluid communication with a bottom chamber 130 and allow fuel to freely travel through their inner cavities 71, 72, 73, 74, and 77, respectively, and reach the surface of faceplate 2 as best viewed in FIG. 17.

Referring again to FIGS. 13 and 14, the five tubes 61, 62, 63, 64, and 75 extend through a large opening 80 at the center of faceplate 2. Their top surfaces are preferably flush with the top surface of faceplate 2. As the tubes 61, 62, 63, and 64 are in direct abutment with center tube 75 at one end and the inside wall of faceplate 2, they define a series of four inner conduits 81, 82, 83, and 84. These four inner conduits 81, 82, 83, and 84 are in fluid communication with a top chamber 140 and allow oxygen gas to freely travel through them and reach the surface of faceplate 2 as best viewed in FIG. 17. On the side of the tubes 61, 62, 63, and 64 are inner conduit sections 86, 87, 88, and 89 each having a cross-sectional shape of a triangle with an arcuate base similar to the cross-sectional shape of conduit section 20 seen in FIG. 2.

FIG. 14 further depicts another preferred embodiment, albeit with fifteen laminar flow jets 10 as opposed to the eight jet configuration shown in FIG. 13. The laminar flow jets 10 are comprised of the preferred teardrop shaped opening 1 and nested circular tube 8 configuration. The fifteen laminar flow jets 10 are radially arranged relative to a centerpoint 95 of faceplate 2 in an outer ring 90. The points 5 of the teardrop shape 1 point away from substantially the centerpoint 95. The inner array features the same flower pattern 70 as first illustrated in FIG. 13.

FIG. 15 depicts an alternate embodiment of the faceplate 2 complete with laminar flow jets 10 having the lightbulb shaped cutouts 35 and nested circular tube 8 configuration as depicted in FIGS. 3, 4, and 11. An array of eight jets 10 are radially arranged relative to a centerpoint 96 of faceplate 2 in an outer ring 91. The crescent moon shapes bounded by rounded segment 36 and inner diameter 45 point away from substantially the centerpoint 96. Preferably, the laminar flow jets of this embodiment are arranged such that jets featured on opposite sides of the centerpoint 96 are mirror images of each other.

FIG. 16 provides another alternate embodiment, albeit with fifteen laminar flow jets 10 as opposed to the eight jet configuration shown in FIG. 15. The laminar flow jets 10 are comprised of the alternate lightbulb shaped opening 35 and nested circular tube 8 configuration. The fifteen laminar flow jets 10 are radially arranged relative to a centerpoint 97 of faceplate 2 in an outer ring 92. The rounded segments 36 of the lightbulb shapes 35 point away from substantially the centerpoint 97. The inner array features the same flower pattern 70 as illustrated in FIGS. 13, 14, and 15.

Figure 17:
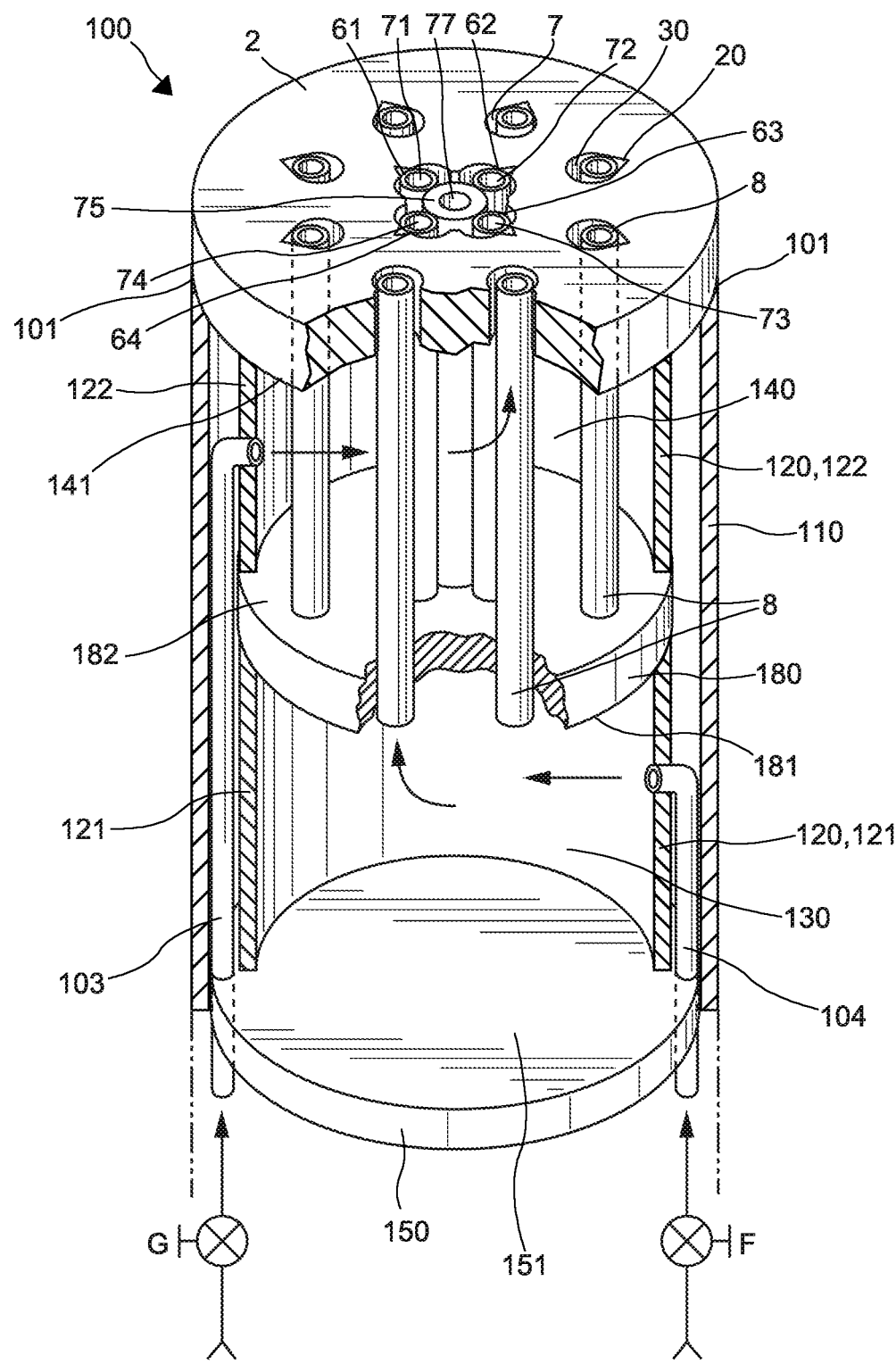
FIG. 17 is a front isometric cutaway view of a gas burner of the present invention.

FIG. 17 is a cutaway drawing of a gas burner 100 featuring the preferred faceplate 2 of FIG. 13, itself including the preferred laminar flow jets 10 with teardrop shaped cutouts 1 and nested circular tubes 8 as seen in FIG. 2. FIG. 17 illustrates the burner 100 with the preferred two-gas, two-chamber embodiment, i.e. utilization of oxygen gas and carbon-based fuel, and how these different gases reach the surface of the burner faceplate 2 so they may be ignited and used in glass working. Oxygen gas and fuel supply lines as well as their sources are well known in the art and are expressed diagrammatically in FIG. 17. The burner 100 is generally cylindrical with exterior wall 110 and baseplate 150. Bisecting the generally hollow body is plate 180. When the faceplate 2 is secured to the burner 100, it forms a fluidtight seal with the top surface 101 of burner body 100.

Plate 180 is integral with and secured in place by generally cylindrical interior wall 120. Bottom chamber 130 is defined by the bottom surface 181 of plate 180, top surface 151 of baseplate 150, and a lower portion 121 of inner wall 120. In this preferred embodiment, bottom chamber 130 houses fuel. Above the bottom chamber 130 is top chamber 140, defined by the top surface 182 of plate 180, bottom surface 141 of faceplate 2, and an upper portion 122 of inner wall 120.

Oxygen gas comes from a source, and is fed through a valve means G, shown schematically in FIG. 17. The user meters the needed amount of oxygen gas which then travels through oxygen gas hose 103 unimpeded and unobstructed, and ultimately passes into top chamber 140. Top chamber 140 is fluidtight such that no oxygen gas can exit it except for the plurality of conduits 7 cutout of faceplate 2. These conduits exist in the outer ring 60 and have teardrop shaped cutouts 1. When the circular tubes 8 are in proper position; i.e. in direct contact with longitudinal points 19 along an inner wall 15, conduits 7 are divided into conduit sections 20 and 30 as best seen in FIG. 2. Oxygen gas can fully flow throughout these conduit sections 20 and 30 except at the longitudinal points 19. Further, oxygen gas may pass through whatever openings exist in the array of jets closer to faceplate centerpoint 65. In this preferred embodiment, oxygen gas may travel to the surface of faceplate 2 via the four inner conduits 81, 82, 83, and 84 and their corresponding inner conduit sections 86, 87, 88, and 89.

Fuel comes from a source and is fed through a valve means F, shown schematically in FIG. 17. The user meters the needed amount of fuel which then travels through fuel hose 104 unimpeded and unobstructed, and ultimately passes into top chamber 140. Plate 180, baseplate 150, and the top portion 122 of interior wall 120 form a fluidtight seal such that none of its contents seep into the top chamber 140, outside of exterior wall 110, or beneath baseplate 150. Fuel can travel only though the inner cavities 11 of circular tubes 8 found in the laminar flow jets 10 of the outer ring 60 as well as the inner cavities 71, 72, 73, 74, and 77, of the tubes 61, 62, 63, 64, and 75, respectively.

Figure 18:
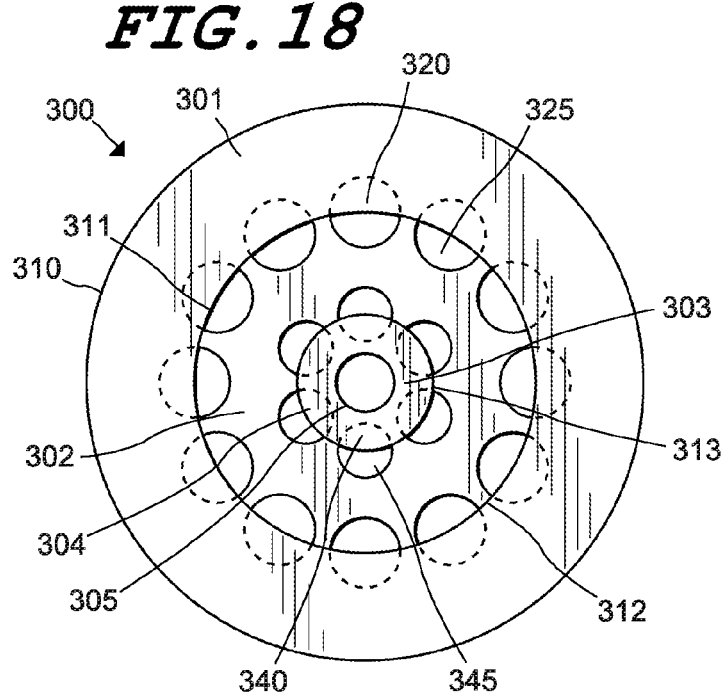
FIG. 18 is a top plan view of an alternate embodiment of the present invention featuring a series of tubes that are not flush to the surface.
Figure 19:
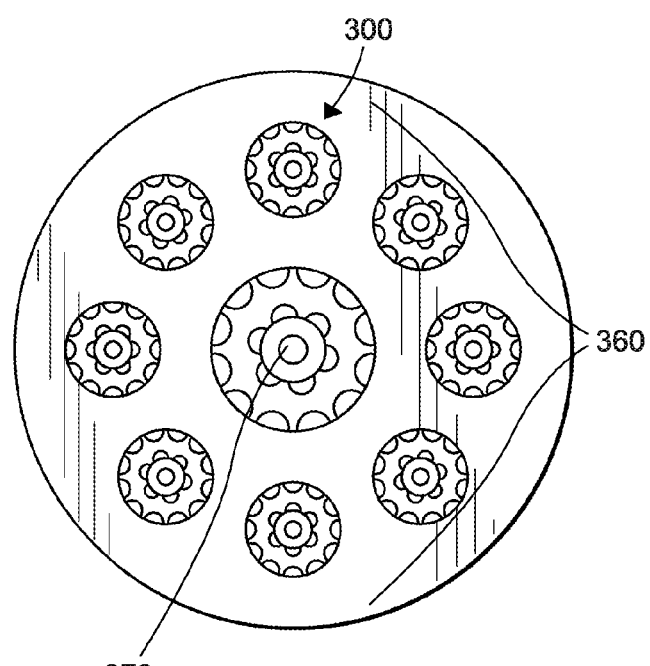
FIG. 19 is a top plan view of another alternate embodiment of the present invention as shown in FIG. 18 in a series on a burner faceplate.

FIG. 18 shows an alternate embodiment 300 in which a series of tubes abut the bottom surface of faceplate 2, as opposed to extending through faceplate openings and terminating flush with the top surface of faceplate 2 as previously disclosed. This embodiment 300 may be employed alone as shown in FIG. 18, or in a series as depicted in FIG. 19. The faceplate 2 is broken into sections, each section having specifically shaped openings to allow the passage of gas from the tube, through the conduits of the faceplate, and up to the surface.

This particular embodiment depicts a faceplate 2 broken into three pieces 301, 302, and 303. These faceplate pieces act as inserts that are placed on top of the exposed tubes and conduits. First faceplate piece 301 is the outer donut shaped ring that conceals a portion of the outer tubes 320 such that only an opening 325, generally shaped as a half-moon, is exposed to the surface. In this embodiment, first faceplate piece 301 covers a portion of twelve outer tubes 320 oriented in a ring towards the outside circumference of the burner. The outer tubes 320 may be in fluid communication with any isolated chamber throughout the burner body. The portion of the outer tubes 320 sealed by first faceplate piece 301, i.e. the portion of outer tube 320 not exposed as half-moon shaped opening 325 is pictured as a dashed phantom line. The outer edge 310 of first faceplate piece 301 defines the outer dimension of the faceplate 2 and is generally flush with the exterior walls of the gas burner.

Similarly, the illustrated embodiment features a third faceplate piece 303, which is the smaller donut shaped ring that conceals a portion of the inner tubes 340 such that only an opening 345, generally shaped as a half-moon, is exposed to the surface. In this embodiment, third faceplate piece 303 covers a portion of six inner tubes 340 oriented in a ring nested inside the outer donut shaped ring of first faceplate piece 301. The inner tubes 340 may be in fluid communication with any isolated chamber throughout the burner body. The portion of the inner tubes 340 sealed by third faceplate piece 303, i.e. the portion of inner tube 340 not exposed as half-moon shaped opening 335 is pictured as a dashed phantom line.

Inserted between first and third faceplate pieces 301 and 303 is the generally gear-shaped second faceplate piece 302. Second faceplate piece 302 is in direct abutment with, and bounded by, the inner circumference 311 of first faceplate piece 301 and the outer circumference 304 of third faceplate piece 303. However, instead of having substantially circular inner and outer circumferences, second faceplate piece 302 has an outer boundary 312 having generally half-moon shaped cutouts adapted to substantially match the half-moon shaped outer tubes 325. This permits gas to flow from its respective chamber, through the opening defined by outer tube 325, through the outer boundary 312, and to the faceplate surface.

Furthermore, second faceplate piece 302 has an inner boundary 313 having generally half-moon shaped cutouts adapted to substantially match the half-moon shaped inner tubes 345. This permits gas to flow from its respective chamber, through the opening defined by inner tube 345, through the inner boundary 313, and to the faceplate surface. By substantially matching the exposed parts of the tubes and conduits, the faceplate pieces work in conjunction to promote laminar flow and therefore increase control and stability of flame chemistries. The faceplate pieces 301, 302, and 303 of this embodiment rest on top of the tube surfaces and are secured by their direct abutment.

FIG. 19 depicts a plurality of the embodiment 300 as seen in FIG. 18 organized on a faceplate. This figure illustrated how the embodiment 300, shown singularly in FIG. 18, may also be configured in a series, much like a single laminar flow jet 10 can be arranged in an array 60 as shown in FIG. 13. FIG. 19 depicts eight individual embodiments 300 radially arranged relative to a centerpoint 370 of faceplate 2 in an outer ring 360. Another embodiment 300 is oriented about the centerpoint 370.

Known in the art are bench type and handheld burners with a faceplate where the fuel jets exit the burner at the base of the flame. The construction of these burners is similar to the burner marketed by American Gas Furnace as shown in FIGS. 20 and 21.

Figure 20:
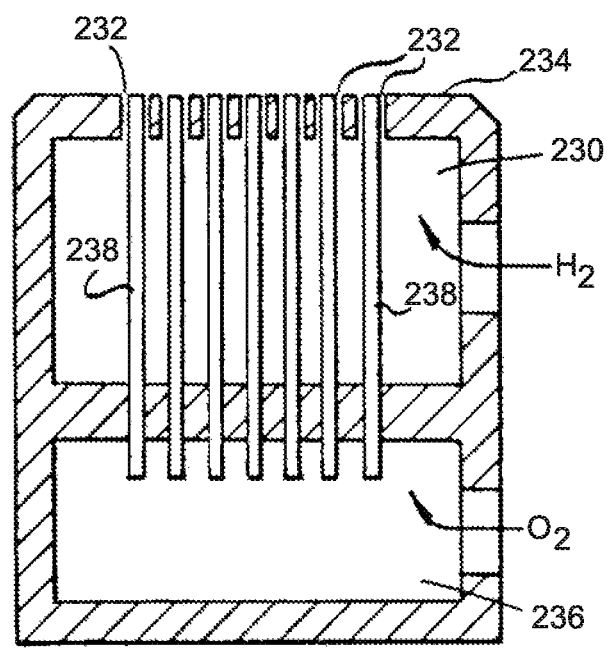
FIG. 20 is a side elevation cross-section view of a prior art gas burner head.
Figure 21:
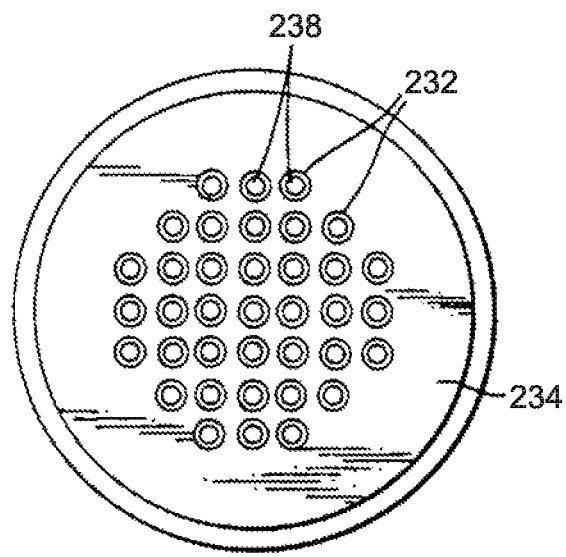
FIG. 21 is a top plan view of the prior art burner head shown in FIG. 20.

Referring now to FIGS. 20 and 21, burners of this type require concisely aligned concentric tubing 238 in combination with faceplate hole jets 232 to deliver individual gases to the faceplate 234. One gas such as hydrogen is delivered to faceplate jets 232 from chamber 230 around tubes 238. Each tube is free-standing being held only at one end extending from chamber 236 through which a second gas such as oxygen is delivered.

Figure 22:
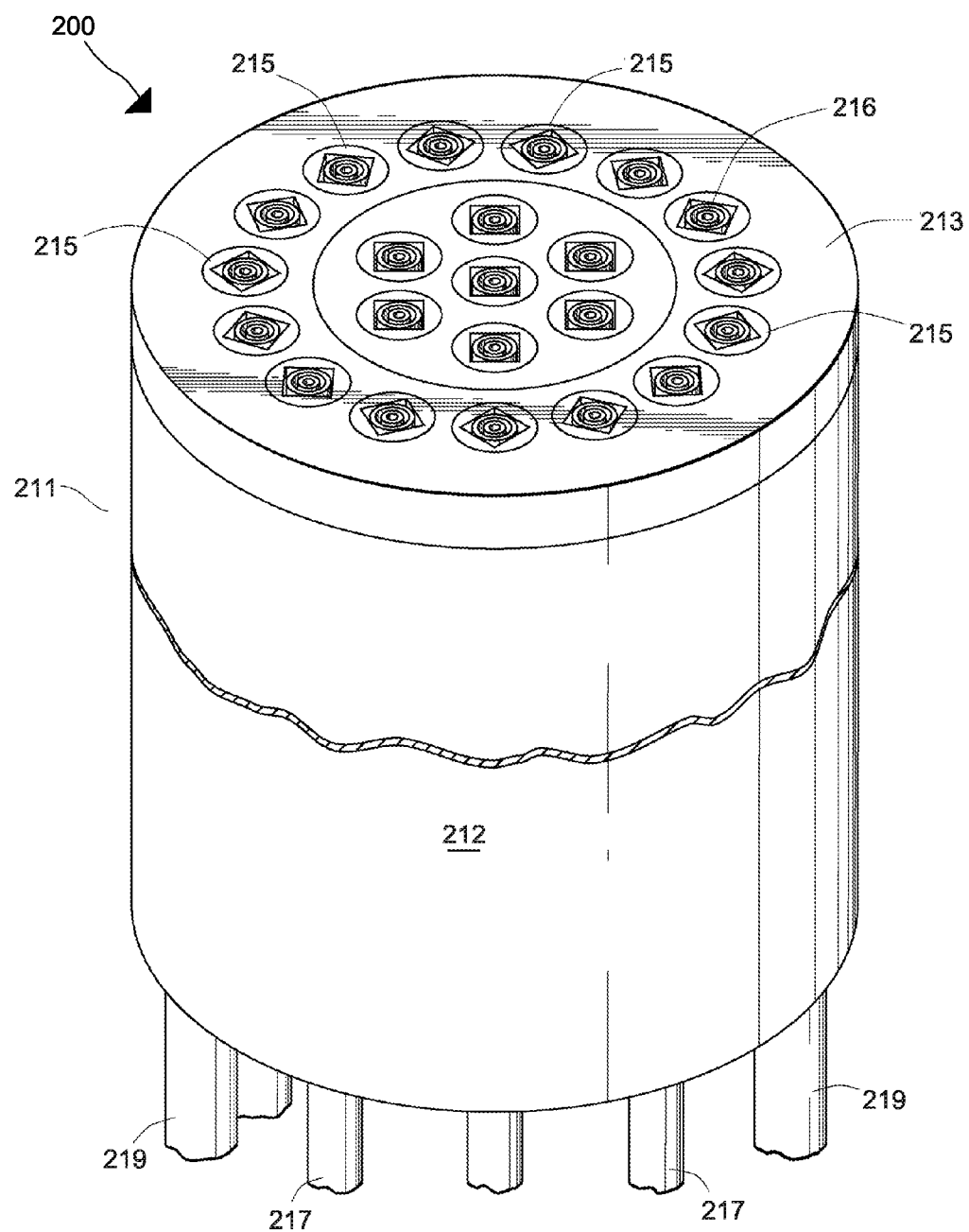
FIG. 22 is a top front isometric view of a burner head of the invention.

Referring now to FIG. 22, a burner 200 employing the invention is shown. The burner 211 has a head portion 212 which includes a faceplate 213. The burner head produces a flame due to the combustion of mixed gases which emanate from jets 215 that are distributed around the faceplate in arrays. The jets include a plurality of concentric tubular members which extend downwardly through the burner head shown at 217 and 219. The construction of this embodiment of the invention is shown in more detail in FIG. 23.

Figure 23:
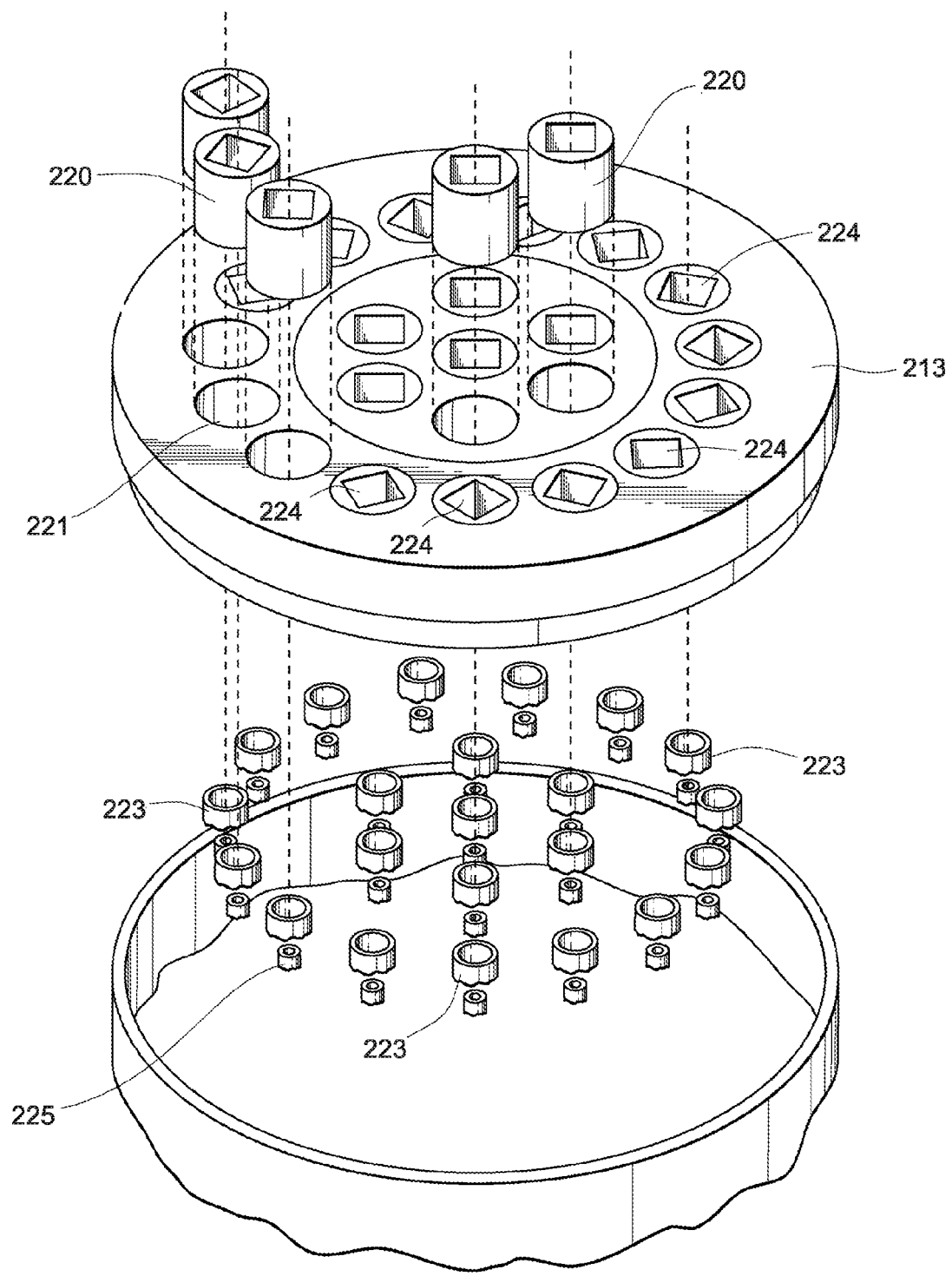
FIG. 23 is a top front isometric exploded view of the burner head shown in FIG. 22.
Figure 26A:
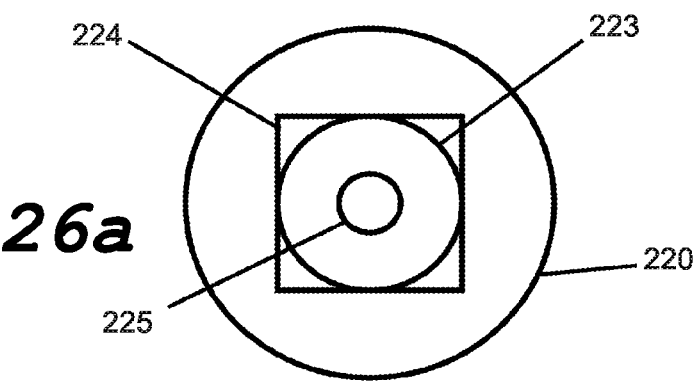
FIGS. 26a, b and c are diagrams showing gas jet configurations.

Referring now to FIG. 23, the alignment of the tubular gas jets provided by the inter-fitting of different geometric shapes is accomplished in part by inserts 220 fitted into the faceplate 213. The faceplate is drilled to provide holes 221 which receive a cluster of inserts. The inserts 220 and corresponding holes 220 may be threaded for better securement, although the present invention does account for unthreaded inserts and holes as depicted in FIG. 23. Each insert is identical as shown here in FIG. 23 and provides an economical tubular member of square internal cross-section 224. Nesting inside the square tube is a first inner-tubular member 223 having an outside diameter substantially equal to the inside width of the square. This is more clearly depicted diagrammatically in FIG. 26a and provides a laminar flow of two gases. For tri-laminar flow, yet smaller tubes 225 lie within tubes 223. In this example, tubes 225 are held coaxially within tubes 223 at their ends as is conventional in the art. Thus, the arrangement of gas jets provided by the above-described delivery tubes provides a concentric tri-laminar flow of three gases: a first jet being a group of four small channels bounded by the square aperture 224 of the insert 221 on the outside and the circular tube 223 on the inside; a second jet being provided by flow through tube 223 bounded on the inside by the outside surface of innermost tube 225; and a third jet being the unrestricted flow through tube 225.

Figure 24:
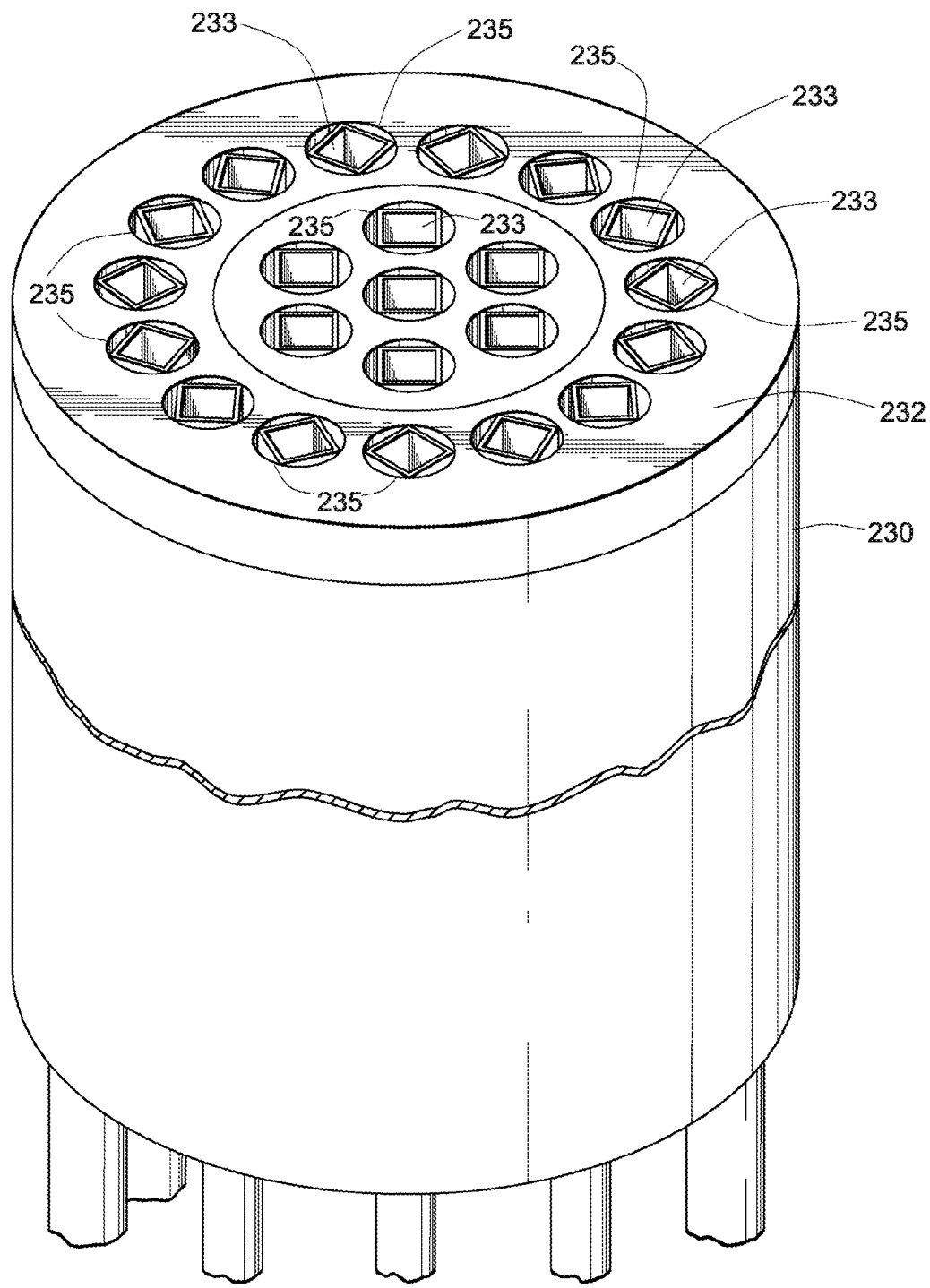
FIG. 24 is a top front isometric view of an alternate embodiment of the invention.
Figure 25:
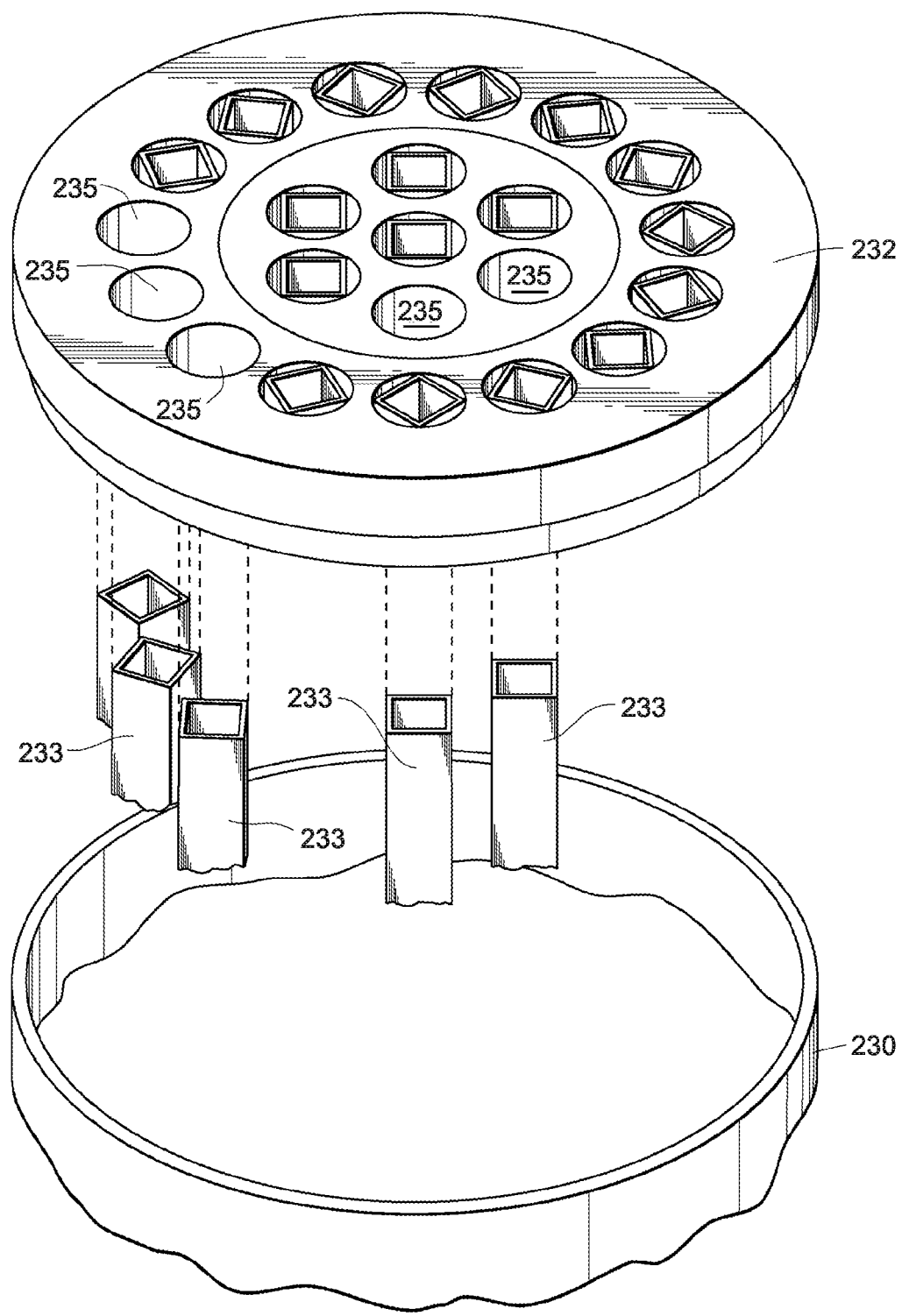
FIG. 25 is a top front isometric assembly view taken of the alternate embodiment shown in FIG. 24.
Figure 26B:
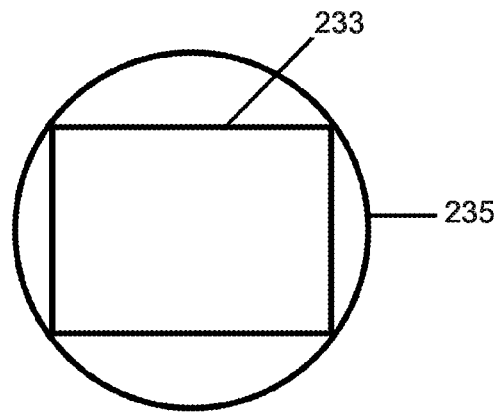

Another embodiment of the invention is shown in FIG. 24 which provides a dual flow burner head 230 constructed from inter-fitting square tubes 233 positioned within an array of drilled holes 235 in the faceplate 232. This construction is more economical than the previous embodiment. As shown here in FIG. 24 and depicted in FIG. 26b, the diagonal dimension of the square tube is approximately equal to the inside diameter of the faceplate hole. This provides an interference fit, or nesting, of the square tubes 233 within the faceplate holes 235 and provides an accurate coaxial alignment of the two fluid conduits formed by this arrangement. Namely, a first conduit is defined by the space within the faceplate hole 235 but around the periphery of the square tube 233, and a second conduit is the square tube itself. FIG. 25 depicts the alignment and placement of the tubes and the fitting of the tubes 233 within the faceplate holes 235 after the holes have been drilled. This construction is also shown diagrammatically in FIG. 26b which is likenumbered for reference to this second embodiment. A construction of this type is significantly advantageous when a large jet size ratio is desired. A small outer jet can be provided while maintaining precise symmetrical alignment with a much larger inner jet.

Figure 26C:
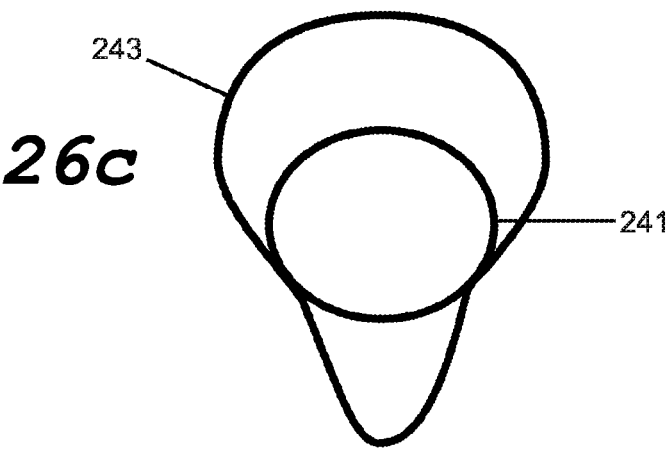

Referring now to FIG. 26, yet other embodiments of the invention may employ the combination of different geometric shapes as desired. FIG. 26c depicts a circular tube 241 within a teardrop outer conduit 243 lying against its tapered side. The outer conduits can be formed by faceplate holes. Thus, the present invention lends itself to any combination of polygonal or arcuate shapes which utilize the principal of the nesting or contacting alignment between adjacent tubular members in order to ensure their consistent alignment throughout their longitudinal adjacency. As an added benefit, the direct contact of the tube provides heat transfer from the inner tubes thus significantly reducing the chance of overheating or carbon buildup.

The foregoing embodiments provide excellent flame characteristics while preserving the advantages of a quiet-running torch that also significantly reduces the chances of overheating or carbon buildup of the jets. By these constructions, assembly of the burners is easier to accomplish and lends itself to experimentation with different shapes to get an optimal gas oxygen combustion. Also, by using the faceplate to space the tubes, fewer jets may be used for increased efficiency and to control the flame characteristics. For example, a burner head utilizing twenty jets constructed according to the present invention is capable of providing a flame size requiring over twice the mount of jets making for a much more powerful, compact and efficient burner as compared to that of the prior art shown in FIGS. 20 and 21. By altering the shape and size of space around the jets on the faceplate, maximum laminar flow for the optimal mixing ratio of fuel and oxygen can be achieved. Also, most importantly, a wide range of flame characteristics may be achieved by varying the shape, size and placement of the jets. There is no limitation to the size or shape of the tubing, and any number of tubes may be used. Torches constructed according to the invention are not limited as to the type of fuel and may use liquid fuel or gas.

The construction of the invention is not limited to surface mix torches but may also be applied to nozzle mix or premix torches. Furthermore, other types of fluids may be employed for different purposes, such as the nozzle heads used in snow making machines. The materials used in constructing the device of the invention can include metal, glass or ceramics. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. For example, the tube shape combinations are unlimited. The polygonal shapes can be hexagonal, triangular, etc. and the arcuate conduits can be of any shape desired.

It should be understood, of course, that the foregoing relates to exemplary embodiments of the invention and that modifications may be made without departing from the spirit and scope of the invention as set forth in the following claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A laminar flow jet, for use in a surface mix gas burner, comprising:
    a head portion including a faceplate being the terminus of a plurality of elongate axially aligned gas delivery conduits, at least two of said conduits delivering at least two different types of fuel flush with a top surface of the faceplate, said faceplate further comprising at least one unthreaded hole, said at least one unthreaded hole having a cross-sectional shape and extending longitudinally through said faceplate;
    at least one unthreaded removable insert adapted to be removably inserted into said at least one unthreaded hole, said at least one unthreaded removable insert having an outer cross-sectional shape that is substantially the same cross-sectional shape as said at least one unthreaded hole; and
    said at least one unthreaded removable insert further comprising a first conduit having a first cross-sectional shape and a second conduit having a second cross-sectional shape wherein longitudinal points along an inside wall of the first conduit are in direct contact with longitudinal points along an outside wall of the second conduit for maintaining the axial alignment of said conduits along their length.

2. The laminar flow jet of claim 1 wherein said second conduit has a circular cross-sectional shape.

3. The laminar flow jet of claim 1 wherein the cross-sectional shape of the first conduit is a teardrop.

4. The laminar flow jet of claim 1 further including a third conduit coaxially aligned with and located within said second conduit which in turn lies within said first conduit.

5. The laminar flow jet of claim 4 wherein said third conduit has a circular cross-sectional shape.

6. The laminar flow jet of claim 4 wherein said third conduit has a polygonal cross-sectional shape.

7. A laminar flow jet, for use in a surface mix gas burner, comprising:
    at least two conduits for delivery of at least two gases, said at least two conduits having
        a first conduit having a first cross-sectional shape,
        a second conduit having a second cross sectional shape,
        wherein said at least two conduits have a conduit length that extends through the entire thickness of a gas burner faceplate;
    at least one tube for delivery of at least one gas, said at least one tube having a third cross-sectional shape, wherein said at least one tube terminates at a bottom surface of said gas burner faceplate,
    the first conduit of said at least two conduits is in axial alignment and fluid communication with said at least one tube such that said at least one gas flows from said at least one tube, through a portion of at least one conduit of the at least two conduits to the top surface of said gas burner faceplate;
wherein said first conduit is divided into multiple conduit sections at said top surface of said gas burner faceplate;
wherein said first cross-sectional shape and said second cross-sectional shape are the same cross-sectional shape.

8. A laminar flow jet, for use in a surface mix gas burner, comprising:
    at least two conduits for delivery of at least two gases, said at least two conduits having
        a first conduit having a first cross-sectional shape,
        a second conduit having a second cross sectional shape,
        wherein said at least two conduits have a conduit length that extends through the entire thickness of a gas burner faceplate;
    at least one tube for delivery of at least one gas, said at least one tube having a third cross-sectional shape, wherein said at least one tube terminates at a bottom surface of said gas burner faceplate,
    the first conduit of said at least two conduits is in axial alignment and fluid communication with said at least one tube such that said at least one gas flows from said at least one tube, through a portion of at least one conduit of the at least two conduits to the top surface of said gas burner faceplate;
wherein said first conduit is divided into multiple conduit sections at said top surface of said gas burner faceplate;
wherein said first conduit is divided into multiple conduit sections when a removable insert having at least one hole is placed inside said first conduit, wherein
    said first conduit is adapted to receive said removable insert, and
    the top surface of said removable insert terminates at said top surface of said gas burner faceplate.

9. A laminar flow jet, for use in a surface mix gas burner, comprising:
    at least one conduit for delivery of a first gas, said at least one conduit having a first cross-sectional shape and a conduit length extending through the entire thickness of a gas burner faceplate;
    at least one tube for delivery of a second gas, said at least one tube having a second cross-sectional shape, wherein
        said at least one tube extends through said at least one conduit and terminates flush with a top surface of said faceplate,
        said at least one tube divides said at least one conduit into a first conduit section and a second conduit section, wherein a portion of said first conduit section is bounded by a first portion of an outside wall of said at least one tube and a first portion of the inside wall of said at least one conduit, and a portion of said second conduit section is bounded by a second portion of said outside wall of said at least one tube and a second portion of said inside wall of said at least one conduit;

wherein longitudinal points along said inside wall of said at least one conduit are in direct contact with longitudinal points along said outside wall of said at least one tube such that axial alignment of said at least one conduit and said at least one tube is maintained along the conduit length; and said first gas is free to flow throughout said first conduit section and said second conduit section except where said longitudinal points along said inside wall of said at least one conduit directly contact said longitudinal points along side outside wall of said at least one tube;

wherein said first cross-sectional shape of said at least one conduit is substantially a teardrop and said second cross-sectional shape of said at least one tube is substantially a circle.

10. The laminar flow Jet of claim 9 wherein longitudinal points along said inside wall of said at least one conduit are in direct contact with longitudinal points along said outside wall of said at least one tube where the dimension of said teardrop is sufficiently small to maintain direct contact at its sides with said outside wall of said at least one tube;

said first conduit section is defined by the point of said teardrop, said first portion of the outside wall of said at least one tube, and the entire thickness of said gas burner faceplate; and said second conduit section is defined by the rounded edge of said teardrop, said second portion of the outside wall of said at least one tube, and the entire thickness of said gas burner faceplate.

11. A laminar flow jet, for use in a surface mix gas burner, comprising:

at least one conduit for delivery of a first gas, said at least one conduit having a first cross-sectional shape and a conduit length extending through the entire thickness of a gas burner faceplate;

at least one tube for delivery of a second gas, said at least one tube having a second cross-sectional shape, wherein said at least one tube extends through said conduit and terminates flush with a top surface of said faceplate, said at least one tube divides said at least one conduit into a first conduit section and a second conduit section, wherein a portion of said first conduit section is bounded by a first portion of an outside wall of said at least one tube and a first portion of the inside wall of said at least one conduit, and a portion of said second conduit section is bounded by a second portion of said outside wall of said at least one tube and a second portion of said inside wall of said at least one conduit;

wherein longitudinal points along said inside wall of said at least one conduit are in direct contact with longitudinal points along said outside wall of said at least one tube such that axial alignment of said at least one conduit and said at least one tube is maintained along the conduit length; and said first gas is free to flow throughout said first conduit section and said second conduit section except where said longitudinal points along said inside wall of said at least one conduit directly contact said longitudinal points along side outside wall of said at least one tube;

wherein every additional tube of said at least one tube delivers an additional gas and has a cross-sectional shape, wherein said additional tube extends through the previous tube and terminates flush with said top surface of said faceplate and said previous tube, said additional tube divides said previous tube into a first tube section and a second tube section, wherein a portion of said first tube section is bounded by a first portion of an outside wall of said additional tube and a first portion of the inside wall of said previous tube, and a portion of said second tube section is bounded by a second portion of said outside wall of said additional tube and a second portion of said inside wall of said previous tube;

wherein longitudinal points along said inside wall of said previous tube are in direct contact with longitudinal points along said outside wall of said additional tube such that axial alignment of said previous tube and said additional tube is maintained along their lengths; and said additional gas is free to flow throughout said first tube section and said second tube section except where said longitudinal points along said inside wall of said previous tube directly contact said longitudinal points along side outside wall of said additional tube.

12. A laminar flow jet, for use in a surface mix gas burner, comprising:

at least two conduits for delivery of at least two gases, said at least two conduits having a first conduit having a first cross-sectional shape, a second conduit having a second cross sectional shape, wherein said at least two conduits have a conduit length that extends through the entire thickness of a gas burner faceplate;

at least one tube for delivery of at least one gas, said at least one tube having a third cross-sectional shape, wherein said at least one tube terminates at a bottom surface of said gas burner faceplate, the first conduit of said at least two conduits is in axial alignment and fluid communication with said at least one tube such that said at least one gas flows from said at least one tube, through a portion of at least one conduit of the at least two conduits to the top surface of said gas burner faceplate;

wherein said first conduit is divided into multiple conduit sections at said top surface of said gas burner faceplate;

wherein said first cross-sectional shape is substantially a teardrop.

13. A laminar flow jet, for use in a surface mix gas burner, comprising:

at least two conduits for delivery of at least two gases, said at least two conduits having a first conduit having a first cross-sectional shape, a second conduit having a second cross sectional shape, wherein said at least two conduits have a length that extends through the entire thickness of a gas burner faceplate;

at least one tube for delivery of at least one gas, said at least one tube having a third cross-sectional shape, wherein said at least one tube terminates at a bottom surface of said gas burner faceplate, the first conduit of said at least two conduits is in axial alignment and fluid communication with said at least one tube such that said at least one gas flows from said at least one tube, through a portion of at least one conduit of the at least two conduits to the top surface of said gas burner faceplate;

wherein said first conduit is divided into multiple conduit sections at said top surface of said gas burner faceplate;

wherein said second cross-sectional shape is substantially a teardrop.

14. A laminar flow jet, for use in a surface mix gas burner, comprising:

a head portion including a faceplate being the terminus of a plurality of elongate axially aligned gas delivery conduits, at least two of said conduits delivering at least two different types of fuel to said faceplate, said faceplate further comprising at least one hole, said at least one hole having a cross-sectional shape and extending longitudinally through said faceplate;

at least one removable insert adapted to be removably inserted into said at least one hole, said at least one removable insert having an outer cross-sectional shape that is substantially the same cross-sectional shape as said at least one hole; and said at least one removable insert further comprising a first conduit having a first cross-sectional shape and a second conduit having a second cross-sectional shape wherein longitudinal points along an inside wall of said at least one insert defining at least a portion of the first conduit are in direct contact with longitudinal points along an outside wall of the second conduit for maintaining the axial alignment of said conduits along their length and wherein the cross-sectional shape of said first conduit is a teardrop.

15. The laminar flow jet of claim 14 wherein the cross-sectional shape of said second conduit is a circle.

16. The laminar flow jet of claim 14 further including a third conduit coaxially aligned with and located within said second conduit which in turn lies within said first conduit.

17. The laminar flow jet of claim 16 wherein said third conduit has a polygonal cross-sectional shape.

18. The laminar flow jet of claim 16 wherein said third conduit has a circular cross-sectional shape.

19. The laminar flow jet of claim 14 wherein both of said types of fuels are gases.

\* \* \* \* \*